US007711207B2

(12) United States Patent
Pollard et al.

(10) Patent No.: US 7,711,207 B2
(45) Date of Patent: May 4, 2010

(54) METHOD AND APPARATUS FOR CAPTURING IMAGES OF A DOCUMENT WITH INTERACTION

(75) Inventors: Stephen Bernard Pollard, Dursley (GB); Maurizio Pilu, Avon (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1532 days.

(21) Appl. No.: 10/900,910

(22) Filed: Jul. 28, 2004

(65) Prior Publication Data
US 2005/0078871 A1 Apr. 14, 2005

(30) Foreign Application Priority Data
Aug. 7, 2003 (GB) ................................. 0318510.5

(51) Int. Cl.
G06K 9/32 (2006.01)
(52) U.S. Cl. ....................................... 382/293; 382/295
(58) Field of Classification Search ......... 382/200–230, 382/103, 293, 295
See application file for complete search history.

(56) References Cited
U.S. PATENT DOCUMENTS
6,396,598 B1 * 5/2002 Kashiwagi et al. .......... 358/474

6,893,132 B2 * 5/2005 Mori et al. ..................... 353/63
7,129,934 B2 * 10/2006 Luman et al. ............... 345/173
7,176,881 B2 * 2/2007 Nishimura et al. .......... 345/156
7,301,666 B2 * 11/2007 Ohta et al. .................. 358/1.18
2002/0180726 A1 * 12/2002 Shi et al. .................... 345/418
2003/0081014 A1 * 5/2003 Frohlich ..................... 345/856

OTHER PUBLICATIONS
Pilu, Maurizio (EP 0191560) "The Method and Apparatus for Scanning Oversized Documents".*
The Patent Office, Search Report Under Section 17, Jan. 16, 2004.

* cited by examiner

Primary Examiner—Vikkram Bali
Assistant Examiner—Soo Jin Park

(57) ABSTRACT

The user assistance system provides a system and method for capturing images of a document and interaction of a primary user with the document in an interaction session. Briefly described, one embodiment comprises an image capture means adapted to capture an initial image of the document and at least one subsequent, additional image of the document during an interaction session, the image being mapped to a known co-ordinate system, interaction capture means for capturing the interaction of a user with the document whereby to determine at least one co-ordinate of a pointer used for the interaction relative to the same co-ordinate system defined for the initial captured image, and processing means for determining an appropriate transform that maps the additional image onto the original image.

26 Claims, 4 Drawing Sheets

METHOD AND APPARATUS FOR CAPTURING IMAGES OF A DOCUMENT WITH INTERACTION

TECHNICAL FIELD

This invention relates to apparatus for capturing images of a document with interaction of a primary user with the document in an interaction session. It also relates to a system for capturing an interaction session for transmission across a network and to a method of sharing documents and interacting with the images across a network.

CLAIM TO PRIORITY

This application claims priority to copending United Kingdom utility application entitled, "Method And Apparatus For Capturing Images Of A Document With Interaction," having serial no. GB 0318510.5, filed Aug. 7, 2003, which is entirely incorporated herein by reference.

BACKGROUND

It is known to provide apparatus which captures images of a primary user at one location interacting with a document or other object. The captured information can subsequently be displayed at a remote site as an image of the document/object and the interaction of the primary user with the document. To be truly useful such apparatus should provide real time images (or almost real time) of the interaction and the document, although the images may be recorded for subsequent transmission to the remote user.

For document sharing with interaction specialist electronic sharing tools have been developed which support the sharing of electronic documents between users across a network. Each user is provided with a computer which is connected to the network and includes a display upon which an image of the document can be presented. It is useful to enable a user to interact with the document and in many applications (such as Netmeeting® by Microsoft Corporation of Redmond Drive, Seattle, Wash., USA) the user can interact with the images by moving a cursor around the screen. The movement of the cursor is then displayed on every users screen at the same time.

The ability to interact with an electronic document through the use of a pointer such as a mouse is difficult and some users do not find it a natural way to interact with a document. The interaction can be very stilted and it does not offer the range of interactions possible when co-present. Working with a hard copy or an original of a document is also easier for many users than interacting with an image on a screen.

Video conferencing, as a genuine alternative, allows a user at a remote site to see how a primary user interacts with an object. A user can then interact with the document and the interaction will also be caught on camera provided it is in the field of view of the camera. The stream of images are then sent across a network to the remote user where the images are reproduced on a screen. The remote user can then see the areas of the document that the user is pointing to. In an even simpler system, the output of a video camera is recorded to a tape which can be played back at a later data by a remote user.

SUMMARY OF THE INVENTION

The user assistance system provides a system and method for capturing images of a document and interaction of a primary user with the document in an interaction session. Briefly described, one embodiment comprises an image capture means adapted to capture an initial image of the document and at least one subsequent, additional image of the document during an interaction session, the image being mapped to a known co-ordinate system, interaction capture means for capturing the interaction of a user with the document whereby to determine at least one co-ordinate of a pointer used for the interaction relative to the same co-ordinate system defined for the initial captured image, and processing means for determining an appropriate transform that maps the additional image onto the original image.

Another embodiment is a method comprising capturing an initial image of the document using an image capture device, capturing the interaction of a user with the document to determine at least one co-ordinate of a pointer used for the interaction relative to a co-ordinate system of the image capture device, capturing at least one additional image of the document, analyzing at least one additional image to determine if the document has moved within the field of view of the image capture device, and determining transform mapping the additional image onto the original image in the event that the document in the additional image is determined to have moved.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views, in which.

DETAILED DESCRIPTION

An exemplary embodiment provides apparatus for capturing images of a document and interaction of a primary user with the document in an interaction session. The apparatus illustrated in FIG. 1 comprises of a primary user device 100 connected across a network 200 to two remote user devices 300. The network 200 in this example comprises a telecommunications network of optical fiber with each of the primary and remote user devices connecting to the network 200 using a compatible modem. Any other suitable communication network may be used.

Figure 2:
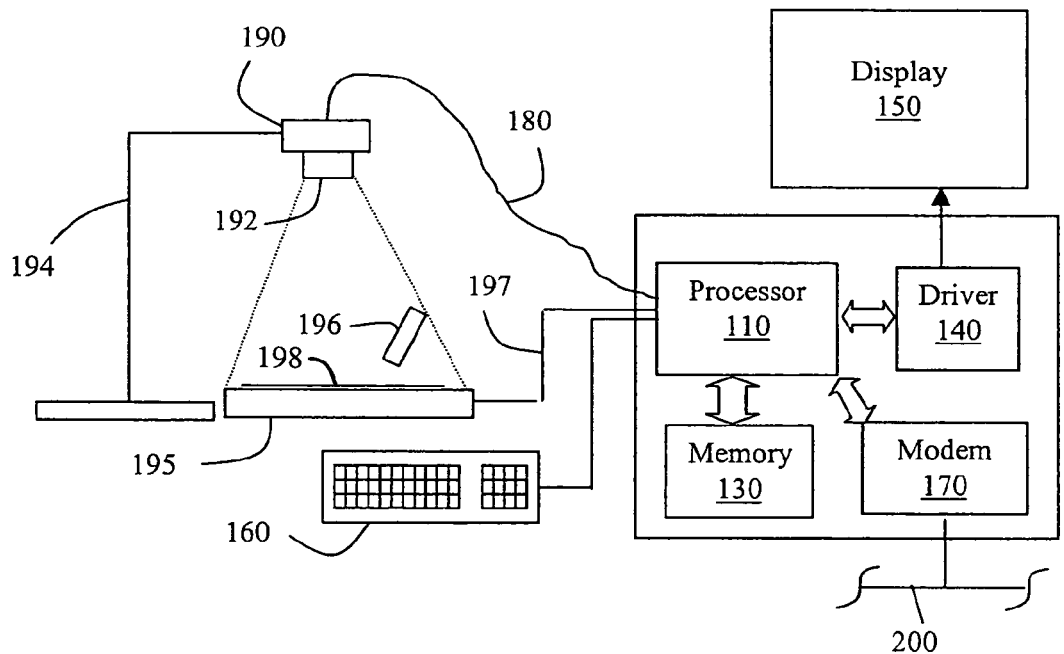
FIG. 2 is a higher detail schematic view of one embodiment of the primary user device provided at a location at which interaction with a document is required.

The primary user device 100 is located at the premises of a primary user and is illustrated in more detail in FIG. 2 of the accompanying drawings, whilst the remote user devices 300 are situated at other remote locations. Placement of the remote device uses any suitable connection to the network 200.

Figure 1:
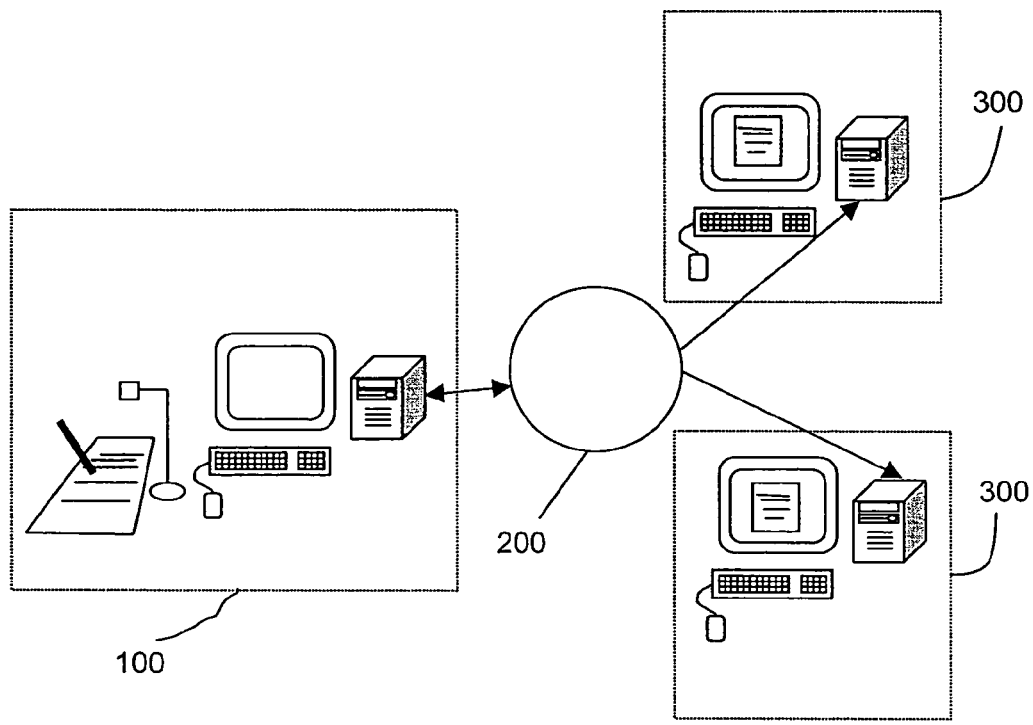
FIG. 1 is an overview of a networked apparatus which comprises one example of an embodiment.

The primary user device 100 comprises a processor 110, which is connected across a bus to a memory 130, a display driver 140, a display 150 such as, but not limited to, a computer monitor screen, an input device 160, which in this example comprises a keyboard, and a transmission means such as a modem 170. A storage device (not shown) also may be provided such as, but not limited to, a hard drive, and a means for storing data produced by the processor on the storage device, in some embodiments. The memory 130, or other suitable medium, stores a computer program which consists of program instructions which are to be executed on the processor 110. The modem 170 connects the primary user device 100 to the network 200 (FIG. 1). These components could be embodied as a personal computer, a laptop computer or the like.

In one embodiment, the processor 110 is also connected through a cable 180 to an image capture means such as a digital camera 190. The camera 190 comprises a fixed focus lens 192 positioned in front of a detector (not shown). The detector comprises a charge coupled device having an array of light sensitive pixels. The camera 190 includes a read-out circuit which measures the output of each pixel at an instant in time and produces an image from the outputs. This image is passed along the cable 180 to the processor 110 where it is subsequently passed to the memory 130 for storage.

The camera 190 is supported by a metal stand 194 at a fixed height above a surface such as a desktop on which the stand 194 is placed. The surface also supports an interaction capture means for capturing the interaction of a user with the document 198. In the exemplary embodiment shown in FIG. 2, the interaction capture means comprises an electronic tablet 195 such as, but not limited to, that sold under the name Wacom® by Wacom Technology Corporation, 1311 SE Cardinal Court, Vancouver, Wash. 98683, USA. A document 198 which a user wishes to interact with is placed on the surface of the tablet 195 within the field of view of the camera. The electronic tablet 195 detects the position of a pointer 196 which can be used by a presenter to interact with the document 198 on the tablet 195, and the tablet 195 generates a set of co-ordinates which indicate where the pointer 196 is relative to the tablet 195. These co-ordinates are passed along a cable 197 to the processor 110 in this embodiment. Other means of communicating the co-ordinates may be used by other embodiments.

The camera 190 is calibrated with respect to the tablet 195 so that points in the field of view of the camera 190 are at known co-ordinates of the tablet 195, and an initial image of the document 198 is captured by the camera 190. The image is captured at the highest resolution of the camera 190 and the resulting image of the document is overlain with a co-ordinate grid and stored in the memory. During a presentation session in which a user interacts with the document 198 by moving the pointer 196, the co-ordinates of the pointer 196 are fed to the processor 110. Since the co-ordinates of the document image are known, this co-ordinate information allows the location of the pointer 196 relative to the document to be determined.

Of course, the exact nature of the pointer 196 is not essential to the various described embodiments. The key feature of any pointer 196, which may even be the primary user's hand, is that its position can be determined in terms of the co-ordinate frame of the camera 190. Using a tablet 195 which is calibrated to the camera 190 is only one solution. The camera 190 could, in an alternative embodiment, capture images of the pointer 196.

During capture of the interaction, the camera 190 continues to view the document 198 and images of the document are captured at regular intervals. These images of the document need not be high resolution images but need only contain enough detail for the processor 110 to be able to determine whether or not the document 198 moves within the field of view of the camera 190. For a camera 190 looking directly down onto a document 198 from above, the possible types of movement of the document 198 on the surface are either translation or rotation, or a combination of the two.

Once the images have been captured, the program instructions held in the memory 130 are executed by the processor 110 to cause the processor 110 to provide an image capture means for analyzing the captured images and a transform processing means for determining an appropriate transform that maps the additional images onto the original image. Embodiments may use any of the numerous methods which exist by which the processor 110 can operate to determine the nature of any movement of the document 198 as seen in the captured images, and produce a mapping which will map or transform the new position of the document 198 onto its original position. Again, embodiments are not to be limited to any one particular method. Nevertheless, one example method is known from EP 1091560, incorporated herein by reference. In this document, a method is disclosed in the context of a flat bed scanner which allows multiple images of an oversize document to be stitched together. To do so, the pieces of the document must be matched to one another. In this exemplary embodiment, the process is slightly more involved since there may be other information present in the additional images such as a user's hand or a pointing device. To overcome this, we must avoid those regions of the additional images that result from unwanted foreground information.

In summary, the processor 110 compares each image with the original image, and if the document 198 has moved, then a transform is produced which maps the co-ordinates of the original document image onto the moved document image. This mapping is then applied to the co-ordinates of the pointer 196 so that they too are mapped onto the same set of co-ordinates as the moved document 198. This ensures that the pointer co-ordinates remain valid with respect to the co-ordinates of the moved document 198.

Having mapped the additional images to the original image and captured the user's interaction, a data generating means generates a data set of information that includes the original image and the mapped co-ordinates. As before, the data generating means may be provided by the processor 110 executing program instructions stored in the memory 130.

The initial high-resolution document image and each of the transformed pointer co-ordinates, which are produced by the primary device 100, are passed across the network to the remote device 300. The information passed in this example comprises a single initial image of the document formatted as a PDF document, and a set of X-Y co-ordinates for the pointer 196. Since it may be desirable for the user of the remote device 300 to print out a hard copy of the document, the resolution of the initial image is preferably in the range 200 to 300 dots per inch (7.87 to 11.8 dots per mm) or higher. This is greater than the typical resolution required for display on a computer monitor of, say 70 dots per inch (2.75 dots per mm). Alternatively, other embodiments employ a lower resolution range.

The remote device 300 (FIG. 3) comprises a composite image generating means 302 embodied within a personal computer 303 which includes a receiver 316 which receives the information that is sent across the network 200 (this may be a modem in one embodiment), a memory buffer 308 in which the PDF image is temporarily stored, a processor 310 which retrieves the buffered information and a display driver 312. The image held in the buffer 308 is fed by the processor 310 to the display driver 312. This in turn produces a video signal 314 that is sent to a video display 316 which presents the image of the document 318 to a user of the remote device 300. When the pointer co-ordinates are received by the receiver 304, the processor 310 instructs the display driver 312 to cause a pointer icon 320 to be displayed on the display 316 which overlays the document image 318. An example of a displayed image 318 of a document 198 with an overlaid pointer icon 320 is given in FIG. 3 of the accompanying drawings.

Because the pointer co-ordinate information is transformed to always correspond to the co-ordinates of the document 198, the interaction will always appear at the correct point in the rendered image 318 of the document 198, even if the document 198 has been moved accidentally or on purpose.

In an alternative, the pointer co-ordinates need not be transformed but could remain the same whilst the document co-ordinates are all transformed. A new "transformed" image 318 of the document 198 could be produced by mapping the original high-resolution image onto the new co-ordinates. The transform for the moved image can then applied to the original image to produce a moved image. This is not as preferable as mapping the pointer co-ordinates as it requires a much higher processing overhead.

Figure 4:
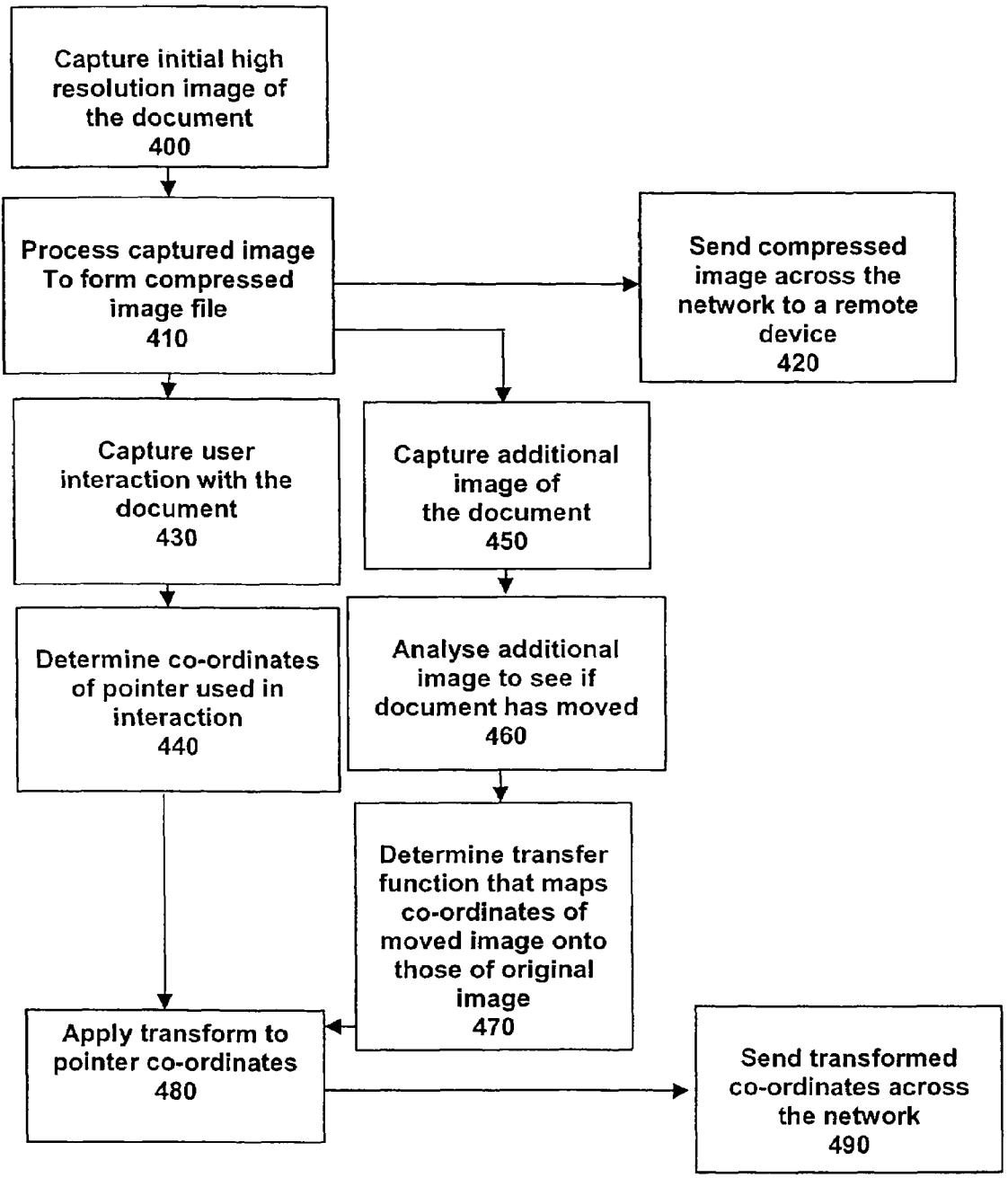
FIG. 4 is a flow chart of the steps performed in the capture and presentation of a session of interaction across the networked apparatus of FIG. 1.

The operation of the apparatus can best be understood with reference to the flow chart of FIG. 4 of the accompanying drawings. It will be understood that the process of FIG. 4 may be performed by a processor executing a set of appropriate program instructions stored in an area of memory 130 (FIG. 2).

At block 400, an initial high-resolution image of the document 198 (FIG. 2) is captured. This event may be initiated by any user of the primary device 100 (FIG. 1). At block 410, the captured image data is processed by the processor 110 (FIG. 2) of the primary device 100 to produce a compressed image, such as, but not limited to, a PDF file.

At block 420, the compressed image is then sent across the network 200 (FIG. 1) to the remote device 300 where it is rendered on a display 316 (FIG. 3) by the display driver 312.

At block 440, after capturing the initial high resolution image, the interaction of a user with the document 198 is captured and the co-ordinates of the pointer 196 used for the interaction are determined relative to the co-ordinate system of the camera 190 (FIG. 1). At block 450, at the same time in one embodiment, additional images of the document 198 are captured. At block 460, the processor 110 analyses the images to see if the document 198 has moved within the field of view of the camera 190. At block 470, if it has moved, then the processor 190 determines an appropriate transform that maps the moved image onto the original image. At block 480, this transform is then applied to the calculated co-ordinates of the pointer 196 to produce mapped co-ordinates.

Figure 3:
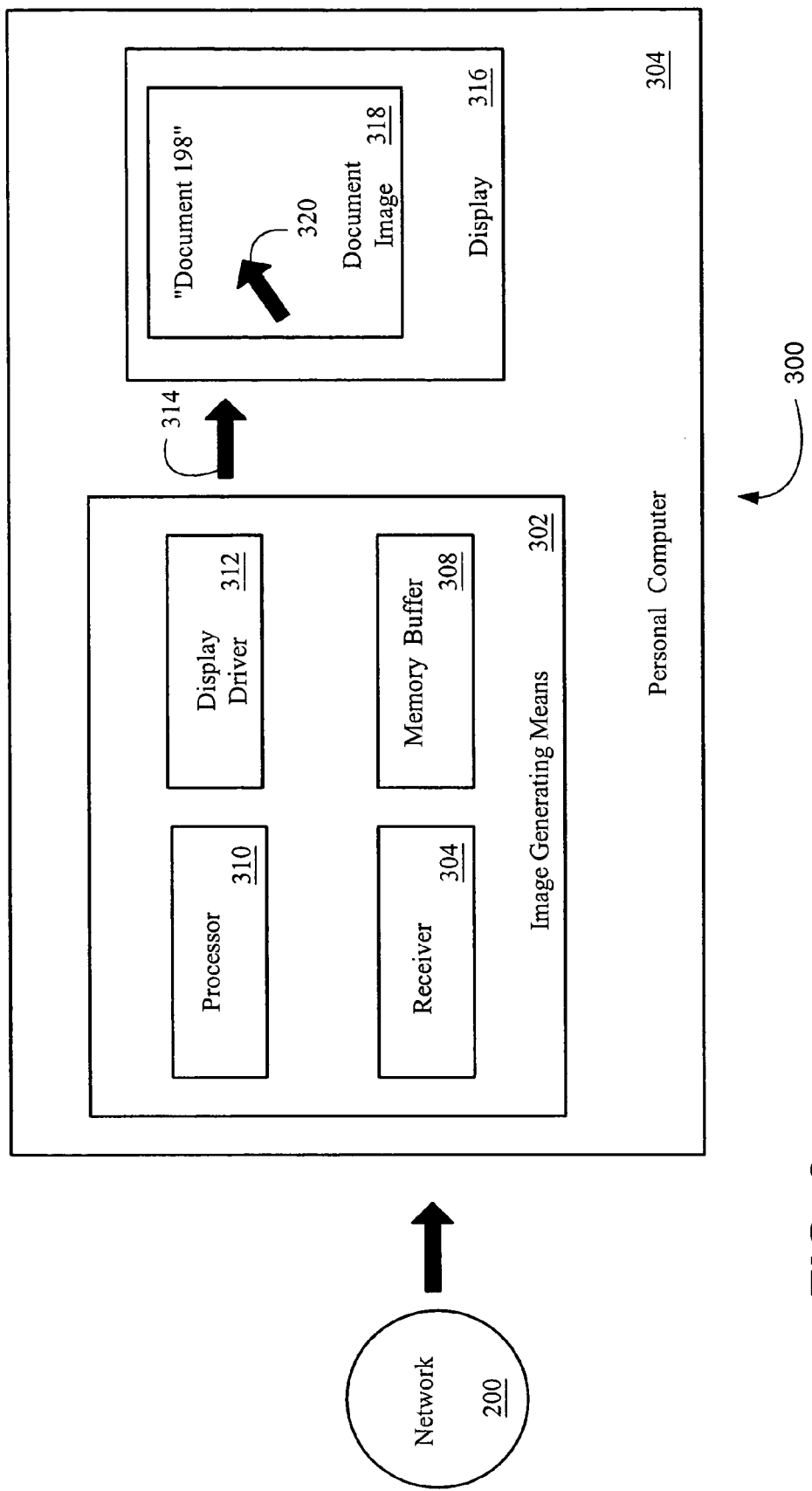
FIG. 3 is an example of a displayed composite document and pointer icon image that can be produced by the apparatus of FIG. 1.

Finally, at block 490, the mapped co-ordinates are sent across the network 200 to the remote device 300 (FIG. 3). The processor 310 of the remote device 300 instructs the display driver 312 to display a pointer icon 320 at the mapped co-ordinates which overlays the displayed image 318 of the document 198.

The above-described example removes the errors that would otherwise arise if the document 198 moves after initial image is captured. There is no need to send lots of document images, and so the amount of bandwidth needed is reduced.

Figure 5:
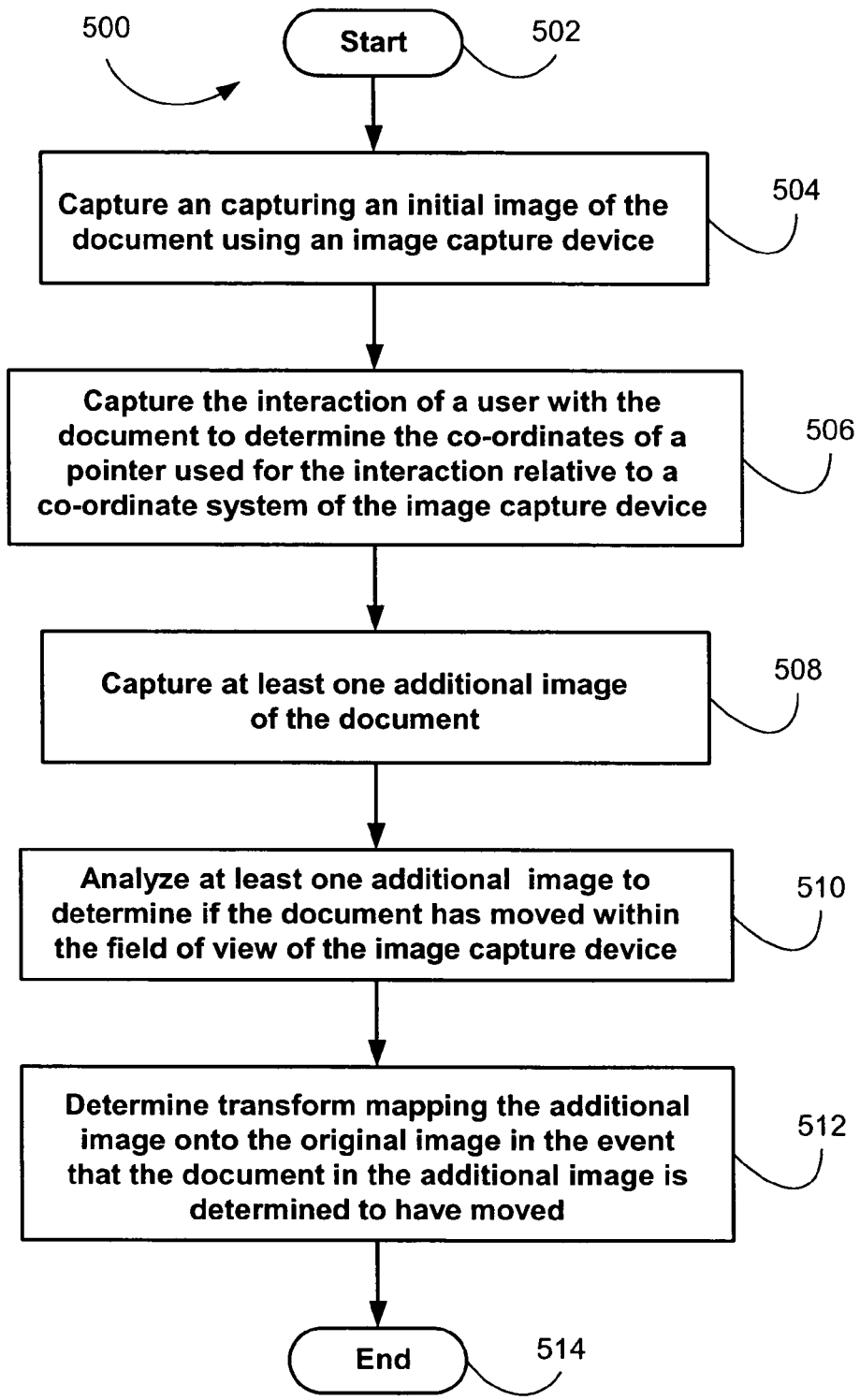
FIG. 5 is a flow chart illustrating the architecture, functionality, and operation of a possible implementation of a program for implementing another embodiment of the apparatus.

FIG. 5 is a flow chart 500 illustrating the architecture, functionality, and operation of a possible implementation of the program for implementing another embodiment of the apparatus. In this regard, each block may represent a module, segment, or portion of code, which comprises one or more executable instructions for implementing the specified logical function(s). It should also be noted that in some alternative implementations, the functions noted in the blocks may occur out of the order noted in FIG. 5 or may include additional functions. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process starts at block 502. At block 504, an initial image of the document is captured using an image capture device. At block 506, the interaction of a user with the document is captured to determine the co-ordinates of a pointer used for the interaction relative to a co-ordinate system of the image capture device. At block 508, at least one additional image of the document is captured. At block 510, at least one additional image is analyzed to determine if the document has moved within the field of view of the image capture device. At block 512, transform mapping of the additional image onto the original image is determined in the event that the document in the additional image is determined to have moved. The process ends at block 514.

In one embodiment, many additional images will be captured to form a video stream, and a transform may be produced for each additional image. The interaction corresponding to each of the additional images may also be captured.

In a refinement where more than one additional image is captured, an embodiment may include an image analysis means which is arranged to analyse each of the additional images to determine if the document in an additional image has moved within the field of view of the image capture device, a transform being produced for an additional image in the event that the document in the additional image has moved. If the document 198 has not moved, no transform will be produced in this refined version, reducing the amount of processing needed.

By moved, we may mean herein that it has moved relative to the original image or relative to another additional image for which a transform has already been determined. In the later case, the transform for that other additional image may be re-used. This further reduces the amount of processing required by reducing the number of transforms that need to be determined.

Embodiments may also include transform applying means arranged to apply the transform to the captured co-ordinates of the pointer 196 (FIG. 2) to produced mapped pointer co-ordinates. Alternatively, the transform applying means may be arranged to apply the transform to the co-ordinates of the additional images to transform the additional images to the same co-ordinates for the original image and thereby produce mapped document co-ordinates. In either embodiment, the effect is to ensure that the co-ordinates of the pointer are correct relative to the co-ordinates of the original image and of the additional images to allow for changes in the position of the document.

The embodiment may also include data generating means for generating a data set of information that includes the initial captured image and the mapped co-ordinates.

Embodiments therefore generate data representative of an interaction session containing sufficient information to allow a reader of the information to determine the content of a document 198 (FIG. 2) and the interaction of the user with the document. Even if the document 198 moves during the session, the captured co-ordinates of the pointer 196 will be mapped to relate to the actual position of the pointer 196 relative to the contents of the document 198.

Embodiments may include a transmission means adapted to transmit the generated data across a network 200 (FIG. 1) to a remote device 300. The transmission means may comprise a modem 170 (FIG. 2). The generated data may be sent in real time, or an approximation of real time, to a remote device 300 (FIG. 1). This embodiment could be used to permit synchronous communication. Alternatively, the information may be sent at the end of an interaction session, or at any other time upon request by a user of a remote device connected to the network. This embodiment provides for asynchronous communication between the apparatus and the remote device. The generated data may be packaged as an email document or an attachment to an email document for transmission across the network.

By sending a data set of information consisting of an initial image and the interaction across the network, the remote user is given enough information to produce a composite image of the document and the interaction. A user of the remote device can "see" the interaction of the primary user with the document 198. Because the position of the document 198 is monitored during the time of capture of the interaction session, then any movement of the document 198 since the capture of the initial image may be compensated to ensure that the interaction is aligned with the image of the document 198. Thus, only a single initial image of the document 198 needs to be transmitted.

Alternatively or additionally, embodiments may include means for storing the generated data set on a storage device. Typical data storage devices include: compact discs (CDs), magnetic tape, floppy discs or solid state memory devices.

Where the data storage is a portable storage device (such as a CD) the storage device can readily be distributed to a remote user at a remote device. Enough information is provided in the generated data for a user to reconstruct the interaction session.

The generated data set may include only a single initial captured image of the document 198. This may be captured at the start of a session of interaction, or just before it starts. The mapped pointer information may then be sent at regular intervals during the session, or perhaps continuously. This may happen in real time.

The initial captured image may have a higher resolution than the additional images. For example the initial image may have a resolution of 200 dots per inch (7.87dots per mm) or greater, allowing it to be printed as a hard copy with reasonable quality. The additional images, which are not intended to be viewed, may be captured at a resolution of, say, less than 70 dots per inch (2.75 dots per mm).

The interaction capture means may capture interaction information at predefined intervals in time during the interaction. For example, in one exemplary embodiment, every 1/50th of a second or perhaps more often than that. Embodiments may alternatively capture the information continuously. To reduce the amount of bandwidth needed to send the pointer information, images may be captured at a lower rate, say once every 0.5 seconds, but this will produce a stilted image of the interaction that may be harder to follow.

The image analysis means may determine the location of the document 198 relative to a known datum at predefined intervals, which may correspond to the times at which the interaction information is captured. In some embodiments, an image may be captured and analyzed whenever a set of pointer co-ordinates are determined.

In some embodiments, the image capture means may comprise a camera 190 (FIG. 2) such as a digital camera. The interaction capture means may also comprise a camera, again perhaps a digital camera. The same camera may be used to capture the document images and also the interaction during the session.

In some embodiments, if the interaction capture device comprises a camera 190, an image processor may be provided which identifies the location of a pointer 196 within images captured by the camera 190. Edge detection may be used to detect the location of a pointer 196 in an image.

In some embodiments where a camera 190 is used the document may be provided with a datum point, for example in one corner of the document 198, the camera 190 may track the location of this point within its field of view so as to determine the location of the document 198.

In some embodiments, more than one datum point may be marked on the document 198 and the relative position of these points may be used by the camera 190 to determine the rotation of the document 198 if it is moved. Alternatively, a feature which does not have rotational symmetry may be identified in the document 198 and the image may be processed to determine the orientation of the feature.

The pointer 196 may comprise a pointing device which can be held by a user such as a wand. On the other hand, the pointer 196 may comprise the user's finger, hand or perhaps arm. In fact, anything that can be used to point to a region of the document 198 and which can be detected by the interaction determining device is suitable. In some embodiments, the pointer 196 may comprise a virtual pointer such as a laser pen or other optical device which illuminates a region of the document and can be detected by a camera 190.

In an alternative embodiment, the interaction capture means may comprise a graphics tablet 195 (FIG. 2) or the like on which the document 198 is placed. The graphics tablet 195 is adapted to co-operate with a pointer or mouse which is moved across the document, and which produces a signal indicative of the position of the pointer or mouse relative to a set of co-ordinates. In this case, the co-ordinates of the graphics tablet 195 should be correlated with a set of co-ordinates for the camera that captures the images. One way to do this is to ensure that known points on the tablet 195 are captured in the field of view of the camera 190, allowing the camera 190 to be calibrated to the co-ordinates of the tablet 195. Then, when an image of the document 198 is captured, its location relative to the co-ordinates of the tablet 195 can easily be determined.

The tablet 195 may be pressure sensitive and require a pointer 198 to be pressed onto the tablet 195. Alternatively, embodiments may use inductive effects to detect the position of a pointer 196 which disturbs the magnetic field around the tablet. Either approach would allow a user to use his or her hand, or a finger on a hand, as a pointer.

In some embodiments, the image processing means may comprise a microprocessor which may comprise a part of a personal computer. A camera 190 and a graphics tablet 195 may be connected to the computer, as well as a modem which permits the computer to connect to a network 200.

In some embodiments, a system for capturing images of a document and interaction of a primary user with the document in an interaction session and the display of the document and interaction at a remote location is provided, the system comprising: image capture means adapted to capture an initial high-resolution image of the document and at least one subsequent, additional images of the document during an interaction session; interaction capture means for capturing the interaction of a user with the document to determine the co-ordinates of a pointer used for the interaction relative to the co-ordinate system of the image capture device; image processing means for determining an appropriate transform that maps the additional image onto the original image and for applying the transform to the captured co-ordinates of the pointer and/or the additional image to produce mapped co-ordinates; a data generating means for generating a data set indicative of the initial captured image and the mapped co-ordinates; transmission means adapted to transmit the generated data set across the network to a remote device; and in which the remote device comprises a composite image generating means which generates a plurality of composite images in which a pointer icon is superimposed on the initial image of the document which is sent across the network.

An embodiment may include image analysis means adapted to analyse the additional images to determine if the document has moved within the field of view of the image capture device. In the case where more than one additional image is captured, such as with a stream of images forming a video clip, a transform may only be produced when the image analysis means has determined that a document seen in an additional image has moved.

The remote device 300 may include a display 316 adapted to display the composite images 318 (FIG. 3). The mapped pointer information may be transmitted across the network 200 in real time and a new composite image 318 may be produced and displayed each time a new set of pointer co-ordinates are received from the network 200.

There may, of course, be more than one remote device 300 connected to the network 200 at any one time. For instance, many users may wish to see a document 198 and interaction at any one time. In this case, each remote device 300 will receive from the network 200 an initial image and the subsequent mapped pointer co-ordinates.

The data set indicative of the captured image that is sent across the network 200 may comprise compressed data which encodes the captured image. It may include some loss of data. Suitable exemplary data formats include TIFF, GIF, PDF, JPEG, though other formats may be used.

In some embodiments, the co-ordinates sent across the network may comprise x-y co-ordinates or polar co-ordinates or any other type of co-ordinate. All that is needed is that the remote device 300 is able to tell from the co-ordinates which part of the initial document is to be overlain with a pointer icon.

In some embodiments, the pointer icon may comprise an arrow, or perhaps an image of a styled hand or a pointing finger. Many other types of icon could be used.

In some embodiments, the data generation means and the processing means may comprise a processor which is arranged to carry out a sequence of program instructions stored in an electronic memory associated with the processor, the processor receiving as its input signals from the image capture means and the interaction capture means. Both the image capture means and interaction means may be embodied by a single camera.

Another embodiment provides a method of capturing the interaction of a user with a document for real-time or time-shifted replay comprising: capturing an initial high-resolution image of the document using an image capture device; capturing the interaction of a user with the document to determine the co-ordinates of a pointer used for the interaction relative to the co-ordinate system of the image capture device; capturing at least one additional image of the document; analyzing the additional image to determine if the document has moved within the field of view of the image capture device; and in the event that the document in the additional image has moved determining an appropriate transform that maps the additional image onto the original image.

In some embodiments, the method may include applying the transform to the captured co-ordinates of the pointer to produced mapped pointer co-ordinates or to the co-ordinates of the additional images to produce mapped image co-ordinates. Additionally, or alternatively, embodiments may include applying the transform to the additional images to produce mapped co-ordinates for the additional images. Embodiments may include a step of generating a data set of information indicative of the image and the mapped co-ordinates. In some embodiments, the method may include sending the data set of information across a network, or storing the information in memory, possibly for subsequent transmission. In some embodiments, the method may comprise capturing the additional images at a lower resolution than the initial image. As the additional images do not need to be displayed they only need enough information to determine how much the document has moved.

In a simplification, in one embodiment, analyzing the additional images to see if the document has moved could be omitted. A transform may be determined for every additional image that is captured. This embodiment increases the amount of processing needed on the data forming the images.

Some embodiments provide a data carrier which carries a computer program which when running on a processing apparatus causes the processing apparatus to: (a) capture an initial high-resolution image of a document using an image capture device; (b) capture the interaction of a user with the document to determine the co-ordinates of a pointer used for the interaction relative to the co-ordinate system of the image capture device; (c) capture at least one additional image of the document; (d) analyse the additional image to determine if the document has moved within the field of view of the image capture device; and (e) and in the event that the document in the additional image has moved determine an appropriate transform that maps the additional image onto the original image.

What is claimed is:

1. An apparatus for capturing images of a document and interaction of a primary user with the document in an interaction session, the apparatus comprising:

image capture means adapted to capture an initial image of the document at an initial position and at least one subsequent, additional image of the document during an interaction session, wherein the document in the additional image has been moved to a new position that is different than the initial position, the initial captured image being mapped to a known co-ordinate system;

interaction capture means for capturing the interaction of a user with the document, whereby the interaction capture means determines at least one co-ordinate of a pointer used for the interaction relative to the same co-ordinate system defined for the initial captured image;

processing means for determining an appropriate transform that maps the additional image onto the initial image; and transmitting means for transmitting to a remote site the initial image and said at least one coordinate of the pointer, wherein the initial image having a pointer at said at least one coordinate of the pointer is displayable at the remote site, wherein the processing means is additionally adapted to apply the transform to the at least one captured co-ordinate of the pointer to produced at least one mapped pointer co-ordinate which is transmitted to the remote site.

2. Apparatus according to claim 1, wherein the interaction capture means determines a plurality of co-ordinates of the pointer.

3. Apparatus according to claim 1, in which more than one additional image is captured and in which image analysis means is provided arranged to analyse the additional image to determine if the document has moved within a field of view of the image capture device, a transform being produced for an additional image in the event that the document in the additional image has moved.

4. Apparatus according to claim 1, wherein the processing means is additionally adapted to apply the transform to co-ordinates of the additional image to transform the additional images to the same co-ordinates for the initial image and thereby produce mapped document co-ordinates.

5. Apparatus according to claim 1, wherein the processing means is adapted to generate a data set of information that includes the initial captured image and the mapped co-ordinates.

6. Apparatus according to claim 5, in which the generated data set includes only a single, initial, captured image of the document in addition to the mapped co-ordinates.

7. Apparatus according to claim 5, which includes storage means for storing the generated data set on a storage device.

8. Apparatus according to claim 5, wherein the transmission means is adapted to transmit the generated data across a network to a remote device.

9. Apparatus according to claim 1, which is arranged to capture the initial captured image at a higher resolution than the additional image.

10. Apparatus according to claim 1, in which the interaction capture means comprises a camera.

11. Apparatus according to claim 1, in which the interaction capture means comprises a graphics tablet on which the document is placed which is adapted to co\-operate with a pointer which is moved across the document and which produces a signal indicative of the position of the pointer relative to a set of co-ordinates.

12. Apparatus according to claim 1, in which the interaction capture means comprises a graphics tablet on which the document is placed which is adapted to co\-operate with mouse which is moved across the document and which produces a signal indicative of the position of the mouse relative to a set of co-ordinates.

13. A system for capturing images of a document and interaction of a primary user with the document in an interaction session and the display of the document and interaction at a remote location, the system comprising:
   image capture means adapted to capture an initial high-resolution image of the document at an initial position and at least one subsequent, additional image of the document during an interaction session, wherein the document in the additional image has been moved to a new position that is different than the initial position;
   interaction capture means for capturing the interaction of a user with the document to determine at least one co-ordinate of a pointer used for the interaction relative to a co-ordinate system of the image capture device;
   processing means for determining an appropriate transform that maps the additional image onto the initial captured image;
   data generating means for generating a data set indicative of the initial captured image and the mapped co-ordinates; and
   transmission means adapted to transmit the generated data set across the network to a remote device, wherein the remote device comprises a composite image generating means which generates a plurality of composite images in which a pointer icon is superimposed on the initial captured image of the document which is sent across the network,
   wherein the processing means further comprises means for applying the transform to the at least one captured co-ordinate of the pointer to produced at least one mapped co-ordinate which is transmitted to the remote device.

14. A system according to claim 13, wherein the interaction capture means determines a plurality of co-ordinates of the pointer.

15. A system according to claim 13, wherein the processing means further comprises means for applying the transform to co-ordinates of the additional images to produced mapped co-ordinates.

16. A system according to claim 13, in which more than one additional image is captured and in which image analysis means is provided adapted to analyse the additional images to determine if the document has moved within the field of view of the image capture device, a transform being produced for an additional image in the event that the document in the additional image has moved.

17. A system according to claim 16, in which the remote device comprises a display adapted to display the composite images.

18. The system according to claim 17, in which mapped pointer information is transmitted across the network in real time and a new composite image is produced and displayed each time a new set of pointer co-ordinates are received from the network.

19. The system according to claim 13, in which more than one remote device is connected to the network at any one time.

20. The system according to claim 13, in which the data set indicative of the captured image that is sent across the network comprises compressed data which encodes the captured image.

21. A method of capturing the interaction of a user with a document, comprising:
   capturing an initial image of the document using an image capture device at an initial position and at least one subsequent, additional image of the document during an interaction session, wherein the document in the additional image has been moved to a new position that is different than the initial position, the initial captured image being mapped to a known co-ordinate system;
   capturing interaction of a user with the document to determine at least one co-ordinate of a pointer used for the interaction relative to the same co-ordinate system of defined for the initial captured image;
   capturing at least one additional image of the document;
   analyzing the at least one additional image to determine if the document has moved within the field of view of the image capture device;
   determining a transform mapping the additional image onto the initial image in the event that the document in the additional image is determined to have moved; and
   a processor applying the transform to a captured co-ordinate of the pointer to produce at least one mapped pointer co-ordinate.

22. The method of claim 21, further comprising generating a data set of information indicative of the image and the mapped co-ordinate of the pointer.

23. A method according to claim 22, further comprising sending the data set of information across a network.

24. The method according to claim 23, wherein the additional images are captured at a lower resolution than the initial image.

25. A method according to claim 22, further comprising storing the information in memory.

26. A computer readable storage medium which stores a computer program which when running on a processing apparatus causes the processing apparatus to:
(a) capture an initial image of a document using an image capture device at an initial position and at least one subsequent, additional image of the document during an interaction session, wherein the document in the additional image has been moved to a new position that is different than the initial position, the initial captured image being mapped to a known co-ordinate system;
(b) capture the interaction of a user with the document to determine co-ordinates of a pointer used for the interaction relative to the same co-ordinate system defined for the initial captured image;
(c) capture at least one additional image of the document;
(d) analyse the additional image to determine if the document has moved within the field of view of the image capture device;
(e) determine an appropriate transform that maps the additional image onto the initial image in the event that the additional image has moved; and
(f) apply the transform to the captured co-ordinates of the pointer to produced mapped pointer co-ordinates.

* * * * *